United States Patent
Xu et al.

(10) Patent No.: US 8,401,266 B2
(45) Date of Patent: Mar. 19, 2013

(54) METHOD AND SYSTEM FOR CORRELATED NOISE SUPPRESSION IN DUAL ENERGY IMAGING

(75) Inventors: Dan Xu, Waukesha, WI (US); David Allen Langan, Clifton Park, NY (US); Xiaoye Wu, Rexford, NY (US); Jed Douglas Pack, Glenville, NY (US); Andrea Marie Schmitz, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 292 days.

(21) Appl. No.: 12/955,227

(22) Filed: Nov. 29, 2010

(65) Prior Publication Data

US 2012/0134561 A1    May 31, 2012

(51) Int. Cl.
*G06K 9/00* (2006.01)
*G06K 9/40* (2006.01)

(52) U.S. Cl. ........ 382/131; 382/100; 382/128; 382/132; 382/254; 382/275

(58) Field of Classification Search .................. None
See application file for complete search history.

(56) References Cited

U.S. PATENT DOCUMENTS

| | | | |
|---|---|---|---|
| 5,396,530 A | 3/1995 | Tsutsui et al. | |
| 6,697,169 B1 * | 2/2004 | Feng et al. | 358/3.04 |
| 6,718,069 B2 * | 4/2004 | Mollov et al. | 382/265 |
| 6,763,142 B2 * | 7/2004 | Dai et al. | 382/260 |
| 7,734,076 B2 * | 6/2010 | Du et al. | 382/128 |
| 8,055,039 B2 * | 11/2011 | Wu et al. | 382/128 |
| 2009/0060313 A1 | 3/2009 | Harer et al. | |
| 2009/0161820 A1 * | 6/2009 | Raupach | 378/19 |
| 2009/0214095 A1 | 8/2009 | Wu et al. | |
| 2011/0158498 A1 * | 6/2011 | Li et al. | 382/132 |

OTHER PUBLICATIONS

Kalender et al., "An algorithm for Noise suppression in Dual energy CT material density image" IEEE Transactions on Medical Imaging, Sep. 1988.*

McCollough et al., "A correlated noise reduction algorithm for dual energy digital subtraction angiography", Med. Phys. Nov./Dec. 1989.*

(Continued)

*Primary Examiner* — Claire X Wang
*Assistant Examiner* — Avinash J Yentrapati
(74) *Attorney, Agent, or Firm* — Jason K. Klindtworth

(57) ABSTRACT

Methods and systems for correlated noise suppression are presented. The present correlated noise suppression technique estimates a correlation direction between noise values in a first and a second MD image corresponding to a first and a second basis material, respectively. The two MD images are diffused using the estimated correlation direction to generate a first and a second diffused image. Further, first and second noise masks are generated by subtracting the diffused image from the corresponding MD image. Edges in the first and the second MD images are processed with the first and second noise masks, respectively to generate a final first noise mask and a final second noise mask. The first MD image is then processed with the final second noise mask to generate a final first MD image and the second MD image is processed with the final first noise mask to generate a final second MD image.

16 Claims, 4 Drawing Sheets

OTHER PUBLICATIONS

Will A. Kalender, Ernst Klotz, and Lena Kostaridou; "An Algorithm for Noise Suppression in Dual Energy CT Material Density Images"; IEEE Transactions on Medical Imaging, vol. 7, No. 3. Sep. 1988; 7 Pages.

C H McCollough, M S Van Lysel, W W Peppler and C A Mistretta; "A correlated noise reduction algorithm for dual-energy digital subtraction angiography"; Name and Date: Impact factor: 3.2, Cited half life: 6.1, Immediacy index: 0.42 Journal: Medical Physics ; 2 Pages, 1989.

* cited by examiner

METHOD AND SYSTEM FOR CORRELATED NOISE SUPPRESSION IN DUAL ENERGY IMAGING

BACKGROUND

Embodiments of the present invention relate generally to diagnostic imaging, and more particularly to methods and systems for correlated noise suppression in dual energy imaging.

Non-invasive imaging techniques are widely used for diagnostic imaging in security screening, quality control, and medical imaging systems. Particularly, in medical imaging, a non-invasive imaging technique such as dual-energy imaging is used for unobtrusive, convenient and fast imaging of underlying tissues and organs. Dual energy imaging involves acquisition of projection data at different energy levels within a relatively small time interval. The acquired projection data sets are processed by a decomposition algorithm, which projects the decomposed projection data onto two sets of basis functions. Typically, the basis functions include either the physical components of an X-ray interaction with matter such as photoelectric and Compton scattering, or attenuation coefficients of two materials, such as water and iodine.

Generally, dual energy imaging provides additional and more specific information about an imaged object than single energy techniques such as conventional computed tomography (CT). Dual energy images, however, suffer from a relatively high level of pixel noise due to the decomposition process. Attempts to reduce the pixel noise by increasing exposure leads to increased radiation dosage for clinical use. Accordingly, conventional dual energy imaging techniques extract a noise mask from one of the two decomposed data sets and add the noise mask to the other data set for reducing noise levels. The conventional techniques, however, extract the noise masks for each of the two decomposed data sets individually, thus resulting in blending of artifacts such as image structures into the noise masks.

Accordingly, a recent dual energy imaging technique proposes post-processing the noise masks to suppress the image structures having correlations that differ from the expected behavior of the correlated noise. To that end, the technique employs a smoothing process such as anisotropic diffusion that exploits the correlation information between the two decomposed data sets to detect and suppress image structures in the noise masks. The noise levels in the decomposed data sets, however, are usually much higher than those in the original images, thus making it difficult to separate the noise from the image structures. Accordingly, the anisotropic diffusion process often causes diffusion of the image structures across object edges causing contamination of the noise masks. The contaminated noise masks result in flawed image reconstruction, which in turn, affects the accuracy of a diagnosis.

It is desirable to develop effective methods and systems that enable correlated noise suppression in dual energy imaging. Particularly, there is a need for a technique that enables robust suppression of correlated noise at the object edges to generate high quality images that facilitate a substantially accurate clinical diagnosis.

BRIEF DESCRIPTION

In accordance with aspects of the present technique, a method for correlated noise suppression is presented. The method includes acquiring a first set and a second set of projection data corresponding to X-rays generated at a first energy level and a second energy level, respectively. Further, the first set and the second set of projection data are decomposed into a first set of material projection data corresponding to a first basis material and a second set of material projection data corresponding to a second basis material. The first set of material projection data is then used to reconstruct a first materially decomposed (MD) image of the first basis material. Similarly, the second set of material projection data is used to reconstruct a second MD image of the second basis material. The method includes estimating a direction of correlation between noise values corresponding to the first MD image and noise values corresponding to the second MD image. The estimated direction of correlation is used to diffuse the first MD image and the second MD image to generate a first diffused image and a second diffused image. The method further includes generating a first noise mask by subtracting the first diffused image from the first MD image and generating a second noise mask by subtracting the second diffused image from the second MD image. One or more edges corresponding to the first MD image are processed with the first noise mask to generate a final first noise mask. Similarly, one or more edges corresponding to the second MD image are processed with the second noise mask to generate a final second noise mask. The first MD image is then processed with the final second noise mask to generate a final first MD image and the second MD image is processed with the final first noise mask to generate a final second MD image.

In accordance with aspects of the present system, an imaging system is described. The imaging system includes a data acquisition system that acquires a first set and a second set of projection data corresponding to X-rays generated at a first energy level and a second energy level, respectively. Further, the imaging system also includes an image reconstruction unit communicatively coupled to the data acquisition system. In one embodiment, the image reconstruction unit decomposes the first set and the second set of projection data into a first set of material projection data corresponding to a first basis material and a second set of material projection data corresponding to a second basis material. The image reconstruction unit then reconstructs a first MD image of the first basis material using the first set of material projection data and a second MD image of the second basis material using the second set of material projection data. The image reconstruction unit further estimates a direction of correlation between noise values corresponding to the first MD image and noise values corresponding to the second MD image. Additionally, the image reconstruction unit diffuses the first MD image and the second MD image to generate a first diffused image and a second diffused image based on the estimated direction of correlation. The image reconstruction unit then generates a first noise mask by subtracting the first diffused image from the first MD image and generates a second noise mask by subtracting the second diffused image from the second MD image. Further, the image reconstruction unit processes one or more edges corresponding to the first MD image with the first noise mask to generate a final first noise mask and one or more edges corresponding to the second MD image with the second noise mask to generate a final second noise mask. The image reconstruction unit then processes the first MD image with the final second noise mask to generate a final first MD image and the second MD image with the final first noise mask to generate a final second MD image.

In accordance with yet another aspect of the present system, a computed tomography (CT) system is described. The computed tomography system includes at least one radiation source that generates X-rays at a first energy level and at a second energy level. The CT system further includes a detector assembly coupled to the at least one radiation source that detects the X-rays generated from the radiation source. Additionally, the CT system also includes an image reconstruction unit coupled to the detector assembly. In one embodiment, the image reconstruction unit decomposes the first set and the second set of projection data into a first set of material projection data corresponding to a first basis material and a second set of material projection data corresponding to a second basis material. The image reconstruction unit then reconstructs a first MD image of the first basis material using the first set of material projection data and a second MD image of the second basis material using the second set of material projection data. The image reconstruction unit further estimates a direction of correlation between noise values corresponding to the first MD image and noise values corresponding to the second MD image. Additionally, the image reconstruction unit diffuses the first MD image and the second MD image to generate a first diffused image and a second diffused image based on the estimated direction of correlation. The image reconstruction unit then generates a first noise mask by subtracting the first diffused image from the first MD image and generates a second noise mask by subtracting the second diffused image from the second MD image. Further, the image reconstruction unit processes one or more edges corresponding to the first MD image with the first noise mask to generate a final first noise mask and one or more edges corresponding to the second MD image with the second noise mask to generate a final second noise mask. The image reconstruction unit then processes the first MD image with the final second noise mask to generate a final first MD image and the second MD image with the final first noise mask to generate a final second MD image.

DRAWINGS

These and other features, aspects, and advantages of the present technique will become better understood when the following detailed description is read with reference to the accompanying drawings in which like characters represent like parts throughout the drawings, wherein.

DETAILED DESCRIPTION

The following description presents systems and methods for correlated noise suppression for multiple energy imaging. Particularly, certain embodiments illustrated herein describe correlated noise suppression at the object edges using correlated diffusion for dual energy imaging. Although the following description describes the correlated noise suppression technique in the context of medical imaging, the present technique may be implemented in various other imaging systems and applications to achieve substantially noise free images. By way of example, the present technique may be implemented in other non-invasive imaging contexts, such as security screening and industrial nondestructive evaluation of manufactured parts. An exemplary system that is suitable for practicing various implementations of the present technique is described in the following section with reference to FIG. 1.

Figure 1:
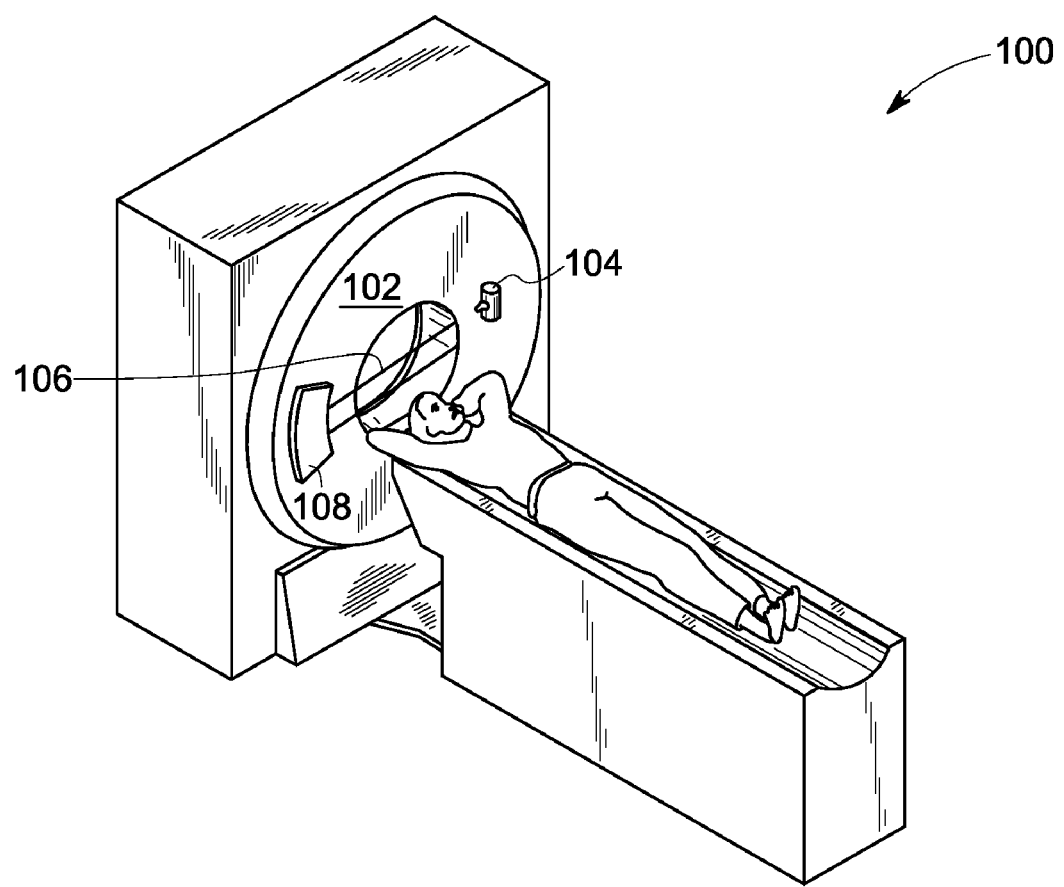
FIG. 1 is a pictorial view of a CT system.

FIG. 1 illustrates an exemplary CT system 100 for acquiring and processing projection data. In one embodiment, the CT system 100 includes a gantry 102. The gantry 102 further includes at least one X-ray radiation source 104 that projects a beam of X-ray radiation 106 towards a detector array 108 positioned on the opposite side of the gantry 102. Although FIG. 1 depicts a single X-ray radiation source 104, in certain embodiments, multiple radiation sources may be employed to project a plurality of X-ray beams for acquiring projection data from different view angles.

Figure 2:
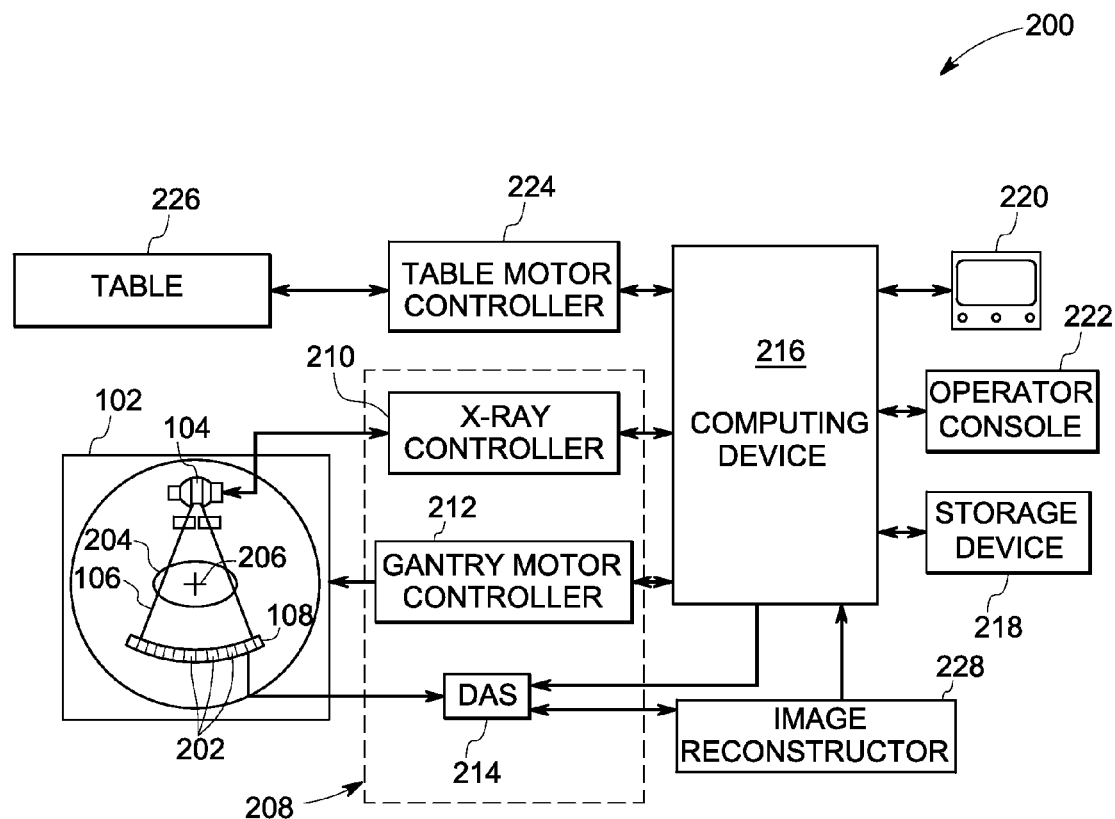
FIG. 2 is a block schematic diagram of an exemplary imaging system, in accordance with aspects of the present technique.

Further, FIG. 2 illustrates an imaging system 200, similar to the CT system 100 of FIG. 1, for acquiring and processing projection data. The imaging system 200, however, may differ from the CT system 100 in one or more structural and functional aspects. By way of example, the imaging system 200 acquires projection data at different energy levels and is capable of generating separate images of different basis materials such as bone and water using X-rays generated at the different energy levels.

For clarity, the imaging system 200 is described in the context of a dual-energy system that acquires projection data of a region of interest (ROI) using X-rays having a first energy level and a second energy level. In one embodiment, the first energy level corresponds to high energy, such as 140 kVp and the second energy level corresponds to low energy, such as 80 kVp. The present correlated noise suppression technique, however, is equally applicable to any system that operates at more than two energy levels and allows a separation of basis materials into separate images.

Accordingly, the detector array 108 of the imaging system 200 includes a plurality of detector elements 202 that together sense the projected X-ray beams that pass through an object 204, such as a medical patient or baggage, to acquire corresponding projection data at different energy levels. In one embodiment, the detector elements 202 acquire the projection data at the first energy level and the second energy level simultaneously. Alternatively, detector elements 202 acquire the projection data at the first energy level and the second energy level in rapid succession.

In certain embodiments, the detector elements 202 include energy discriminative (ED) detector materials capable of separating X-ray photons from one acquisition into two energy bins. Use of ED materials in the detector elements 202 enables projection data acquisition via ED and/or photon counting modes. Additionally, the detector elements 202 facilitate projection data acquisition at speeds that enable the acquisition of high and low energy images with a large energy separation, such as about 90 keV, which further simplifies subsequent image processing operations.

In certain other embodiments, the imaging system 200 traverses different angular positions for acquiring projection data at the different energy levels. To that end, the gantry 102 and the components mounted thereon rotate about a center of rotation 206 for acquiring projection data at the first energy level and the second energy level. Alternatively, in embodiments where a projection angle relative to the object 204 varies as a function of time, the mounted components may move along a general curve rather than along a segment of a circle. Accordingly, the rotation of the gantry 102 and the operation of the X-ray radiation source 104 may be controlled by a control mechanism 208 of the imaging system 200 to acquire projection data from a desired view angle and at a desired energy level. In one embodiment, the control mechanism 208 may include an X-ray controller 210 that provides power and timing signals to the X-ray radiation source 104 and a gantry motor controller 212 that controls the rotational speed and position of the gantry 102 based on scanning requirements.

The control mechanism 208 may also include a data acquisition system (DAS) 214 for sampling analog data received from the detector elements 202 and converting the analog data to digital signals for subsequent processing. The data sampled and digitized by the DAS 214 may be transmitted to a computing device 216. The computing device 216 may store this data in a storage device 218, such as a hard disk drive, a floppy disk drive, a compact disk-read/write (CD-R/W) drive, a Digital Versatile Disc (DVD) drive, a flash drive, or a solid state storage device.

Additionally, the computing device 216 may provide appropriate commands and parameters to one or more of the DAS 214, the X-ray controller 210 and the gantry motor controller 212 for operating the imaging system 200. Accordingly, in one embodiment, the computing device 216 is operatively coupled to a display 220 that allows an operator to observe object images and/or specify commands and scanning parameters via a console 222 that may include a keyboard (not shown). The computing device 216 uses the operator supplied and/or system defined commands and parameters to operate a table motor controller 224 that, in turn, controls a motorized table 226. Particularly, the table motor controller 224 moves the table 226 for appropriately positioning the object 204, such as the patient, in the gantry 102 to enable the detector elements 202 to acquire corresponding projection data at different energy levels.

As previously noted, the DAS 214 samples and digitizes the data acquired by the detector elements 202. Subsequently, an image reconstructor 228 uses the sampled and digitized X-ray data to perform high-speed reconstruction of basis pair material images. Typically, different basis materials corresponding to the object 204 have different absorption characteristics for low energy X-rays and high energy X-rays. Accordingly, the image reconstructor 228 distinguishes between an absorption of X-rays caused by a first basis material, for example water, and an absorption caused by a second basis material, for example iodine, based on the received data. In one embodiment, the image reconstructor 228 generates both high and low energy projections, which are further decomposed based on the differential absorption characteristics corresponding to water and iodine, respectively. Particularly, the image reconstructor 228 decomposes the projection data to generate water and iodine basis pair materially decomposed (MD) images.

Additionally, the image reconstructor 228 generates appropriate noise masks for the water and iodine MD images. Specifically, the image reconstructor 228 processes the noise masks in accordance with aspects of the present technique to generate final noise masks that substantially reduce noise in the water and iodine images. Subsequently, the image reconstructor 228 applies the final noise masks to the original water and iodine images for generating final MD images that are substantially free of noise and cross contamination, especially at the object edges. The image reconstructor 228 then either stores the final MD images in the storage device 218 or transmits the final MD images to the computing device 216 for generating useful information for diagnosis and evaluation.

The computing device 216 may transmit the MD images and other useful information to the display 220 that allows the operator to evaluate the imaged anatomy. Imaging the object 204 at different energy levels using the present technique suppresses noise and structural artifacts in the generated basis pair images, thus providing reliable information for making an informed diagnosis. An exemplary correlated noise suppression method for generating such high quality basis pair images that provide useful information for a substantially accurate diagnosis is described in greater detail with reference to FIG. 3.

Figure 3:
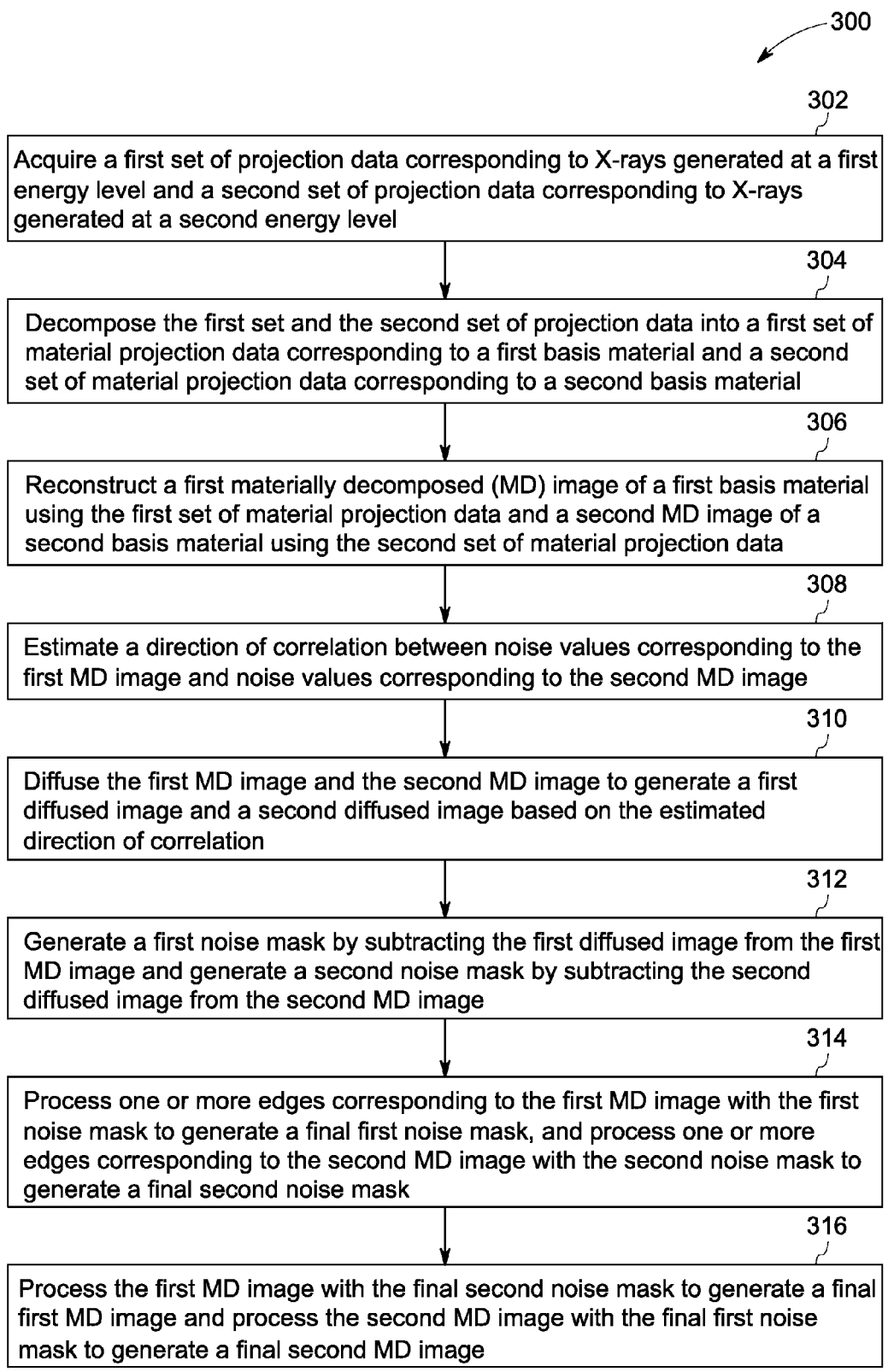
FIG. 3 is a flow chart depicting an exemplary correlated noise suppression method, in accordance with aspects of the present technique.

FIG. 3 illustrates a flow chart 300 depicting an exemplary correlated noise suppression method for generating high quality images for a substantially accurate representation of a desired anatomy. The exemplary method may be described in a general context of computer executable instructions on a computing system or a processor. Generally, computer executable instructions may include routines, programs, objects, components, data structures, procedures, modules, functions, and the like that perform particular functions or implement particular abstract data types. The exemplary method may also be practiced in a distributed computing environment where optimization functions are performed by remote processing devices that are linked through a communication network. In the distributed computing environment, the computer executable instructions may be located in both local and remote computer storage media, including memory storage devices.

Further, in FIG. 3, the exemplary method is illustrated as a collection of blocks in a logical flow chart, which represents operations that may be implemented in hardware, software, or combinations thereof. The various operations are depicted in the blocks to illustrate the functions that are performed generally during material decomposition, correlated diffusion, noise mask generation and final MD image generation phases of the exemplary method. In the context of software, the blocks represent computer instructions that, when executed by one or more processing subsystems, perform the recited operations of an imaging system such as the imaging system 200 of FIG. 2. The order in which the exemplary method is described is not intended to be construed as a limitation, and any number of the described blocks may be combined in any order to implement the exemplary method disclosed herein, or an equivalent alternative method. Additionally, certain blocks may be deleted from the exemplary method without departing from the spirit and scope of the subject matter described herein. For discussion purposes, the exemplary method will be described with reference to the elements of FIG. 2.

The exemplary method aims to generate diagnostic basis pair material images that are substantially free of cross contamination. Accordingly, at step 302, an acquisition system such as the DAS 214 of FIG. 2 acquires a first set of projection data corresponding to X-rays produced at a first energy level and a second set of projection data corresponding to X-rays produced at a second energy level. Although the illustrated embodiment describes projection data acquisition at only two energy levels, other embodiments may include data acquisition at any number of energy levels.

Further, the projection data acquisition may occur via any of a variety of dual or multiple energy protocols. By way of example, the multiple energy protocols may include using multiple sources and multiple detectors, multiple detector layers, and/or an energy discriminating, photon counting detector. In one embodiment, the DAS acquires the first set of projection data at a low energy level in approximately one-half of a full gantry rotation plus a detector fan-angle. Similarly, the DAS acquires the second set of projection data at the high energy level in approximately one-half of a full gantry rotation plus a detector fan-angle. Scanning the ROI by segmenting one full gantry rotation of data acquisition into a low energy half and a high energy half, thus, allows for a nearly full 360 degree plus twice the fan angle acquisition without increasing the scan time. Alternative embodiments may employ a step and shoot scan, a helical scan, a gated scan, alternate biasing of an X-ray tube between a high and a low energy level, or any other suitable technique capable of acquiring the first and the second set of projection data from different energy levels.

At step 304, an image reconstruction unit such as the image reconstructor 228 of FIG. 2 decomposes the first set and the second set of acquired projection data into a first set of material projection data corresponding to a first basis material and a second set of material projection data corresponding to a second basis material. In one embodiment, the first basis material corresponds to water and the second basis material corresponds to iodine. Accordingly, the image reconstruction unit decomposes the first set and the second set of projection data into a first set of material projection data corresponding to water and a second set of material projection data corresponding to iodine. Further, at step 306, the image reconstruction unit uses the first and the second sets of material projection data to reconstruct first MD image of the first basis material and a second MD image of the second basis material, respectively. In one embodiment, for example, the image reconstruction unit reconstructs a water image using the first set of material projection data and an iodine image using the second set of material projection data.

The reconstructed MD images typically include data indicative of a material density of each of the basis materials and, thus, provide specific information about the ROI that may be clinically useful. The reconstructed MD images, however, have much lower signal-to-noise (SNR) ratio than conventional CT images. Typically, in dual energy imaging, the noise in the first and the second MD images is negatively correlated. Conventional dual energy imaging techniques diffuse the first and the second MD images separately to minimize the noise. Individually diffusing the first and second MD images, however, often results in cross contamination due to blending of artifacts such as image structures across the edges during the diffusion process. Accordingly, the present technique uses a correlated diffusion function that evaluates the first and the second MD images concurrently. Particularly, the correlated diffusion function encourages diffusion when the concurrent evaluation detects a correlation between the first and the second MD images and suppresses the diffusion otherwise.

To that end, the image reconstruction unit estimates a direction of correlation between noise values corresponding to the first MD image and noise values corresponding to the second MD image at step 308. In one embodiment, the image reconstruction unit estimates the direction of correlation based on certain system calibration information. Accordingly, the image reconstruction unit determines the system calibration information such as X-ray spectra corresponding to the first energy level and the second energy level, detector efficiency and/or an X-ray filtration used for the dual-energy imaging.

Additionally, in one embodiment, the image reconstruction unit may also employ a basis material attenuation map for estimating the direction of correlation between noise values in the first MD image and the second MD image. Generally, the basis material attenuation map of a particular basis material corresponds to an energy dependent function that describes an attenuation of X-rays passing though the basis material per path length. Particularly, the basis material attenuation map provides useful information relating to certain physical properties of the basis material that is used along with the system calibration information to estimate the direction of correlation between noise values in the first MD image and noise values in the second MD image.

In certain embodiments, the image reconstruction unit may further fine-tune the estimation of the direction of correlation using a multi-pass technique. By way of example, the image reconstruction unit may segment the first and the second MD images into a plurality of subimages of the order of, for example, 200 pixels a side and estimate the direction of correlation for each subimage. To that end, in a first iteration, the image reconstruction unit determines an initial estimate of the direction of correlation based on the system calibration information. The image reconstruction unit then performs an initial diffusion of the first MD image and the second MD image using the initial estimate of the direction of correlation to form the first and the second initial noise masks corresponding to the first and the second basis materials, respectively. Optionally, the image reconstruction unit filters the first and the second initial noise masks using a high pass filter to remove the typically higher frequency structural contamination from the noise masks, thus improving the estimation of the direction of correlation. The step of diffusion and noise mask generation are described in greater detail in the following sections with reference to the description of steps 310 and 312.

Further, in a second iteration, the image reconstruction unit may process the first and the second initial noise masks as a plurality of subimages. In certain embodiments, the image reconstruction unit processes overlapping subimages to form a whole noise mask image. Particularly, the image reconstruction unit processes the overlapping subimages such that each subimage neighboring a selected subimage is centered about 100 pixels away from the center of the selected subimage. The reconstruction unit windows the first and the second initial noise masks to each of the plurality of subimages to generate a first windowed noise mask (n1) and a second windowed noise mask (n2). Further, the image reconstruction unit selects the window functions so as to have a value of 1 at the center of each subimage while tapering down to 0 at the edges such that a sum of all window functions applied to the plurality of subimages is 1 at any given image pixel. The image reconstruction unit then determines an optimal parameter for each corresponding pair of windowed noise masks such that a result of mixing a first windowed noise mask and a corresponding second windowed noise mask in accordance with a value of the determined parameter results in a residual image that minimizes a norm. By way of example, the image reconstruction unit determines a parameter "k" between 0 and 90 degrees to minimize the norm in the following equation 1.

$$\|\cos(k)n1+\sin(k)n2\| \quad (1)$$

The image reconstruction unit then estimates the direction of correlation at each image location based on the determined parameter for each window function and the value of each window function at a corresponding image location. By way of example, once the equation 1 is minimized, the direction of correlation for a particular subimage is determined to be $(-\sin(k), \cos(k))$. The image reconstruction unit, thus, uses equation 1 to fine tune the estimated direction of correlation at different image locations corresponding to different noise mask subimages and diffuses the MD images based on the fine-tuned estimate of the direction of correlation.

Particularly, at step 310, the first MD image and the second MD image are diffused to generate a first diffused image and a second diffused image based on the estimated direction of correlation. In one embodiment, an ease of diffusion or a diffusivity of the MD images varies as a function of a corresponding gradient vector. As used herein, the term "gradient"

refers to a difference between two adjacent pixels in a particular MD image and may typically be a representative of a variation in the object such as a noise value corresponding to the particular MD image and/or a structural component such as an edge of the object. Accordingly, the diffusivity is large when the gradient and an angle between a gradient direction and the estimated direction of correlation are small. Further, the diffusivity is large when the gradient vector magnitude is small. The variation in the diffusivity as a function of the gradient vector will be discussed in greater detail with reference to FIG. 4.

Figure 4:
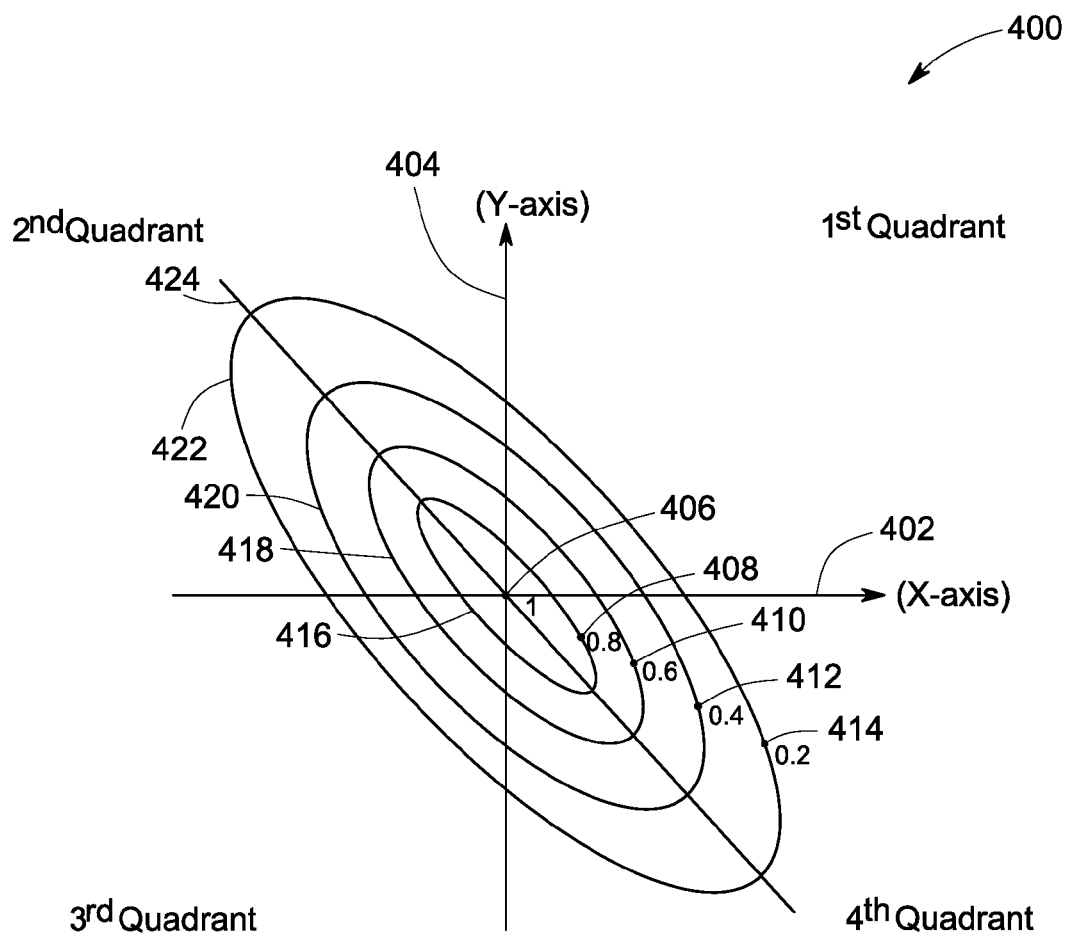
FIG. 4 is an exemplary gradient distribution map illustrating exemplary diffusivity contours that vary as a function of a gradient vector, in accordance with aspects of the present technique.

FIG. 4 illustrates a gradient distribution map 400 depicting exemplary diffusivity contours that vary as a function of a gradient vector corresponding to the first and the second MD images. Particularly, FIG. 4 illustrates exemplary gradient values corresponding to the water and iodine images in a two-dimensional (2D) coordinate system. Although, FIG. 4 illustrates a 2D coordinate system, the present technique may similarly be implemented in a 3-dimensional (3D) coordinate system. In the present embodiment, the coordinate system includes an X-axis 402 and a Y-axis 404. By way of example, the X-axis 402 may correspond to gradient values of pixels in the water image and the Y-axis 404 may correspond to gradient values of pixels in the iodine image. As previously noted, the term "gradient" refers to a difference between two adjacent pixels in a particular MD image. Accordingly, the gradient distribution map 400 depicts the gradient values corresponding to a particular set of adjacent pixels in the water image along the X-axis 402 and gradient values corresponding to the same set of adjacent pixels in the iodine image along the Y-axis 404.

The gradient distribution map 400, thus, depicts gradient values corresponding to all or a determined number of adjacent pixel sets in the water and iodine images. Typically, the gradient values that lie in the second and the fourth quadrants of the illustrated coordinate system may be negatively correlated. Accordingly, in the embodiment illustrated in FIG. 4, the gradient values 406, 408, 410, 412 and 414 that fall in the second or the fourth quadrant of the coordinate system are negatively correlated, and thus, may represent correlated noise. Further, variation in the diffusivity of the water and iodine images at different gradient values 408, 410, 412 and 414 may be represented by the different diffusivity contours 416, 418, 420 and 422. In one embodiment, evaluation of the diffusivity at different locations in the gradient distribution map 400 shows that the diffusivity contours 416, 418, 420 and 422 are substantially aligned along a particular direction representative of the estimated direction of correlation 424. Additionally, the diffusivity contours 416, 418, 420 and 422 are illustrated to have an increasing radius as a corresponding angle approaches the estimated direction of correlation, thus, indicating an increase in diffusion. Additionally, there is an increase in diffusion with a decrease in gradient such that the inner diffusivity contours 416 and 418 represent higher diffusivity values than the outer contours 420 and 422. Although, FIG. 4 illustrates the diffusivity contours 416, 418, 420 and 422 as concentric ellipses, alternative embodiments may use other suitable contours that may be expressed as polar functions. Accordingly, the suitable contours include a minimum radius aligned along a first line orthogonal to the direction of correlation, a maximum radius aligned along the direction of correlation and a radius such that the derivative of the radius with respect to an originating angle varies only when the contour hits the first line and a line aligned along the direction of correlation.

Accordingly, in one embodiment, the first MD image and the second MD image are diffused using a correlated diffusion function that enhances diffusion along the estimated direction of correlation and suppresses the diffusion in a different direction. An exemplary correlated diffusion function applied to both the iodine and water images to encourage diffusion along the estimated direction of correlation may be defined as:

$$c(x) = \frac{1}{1 + (\nabla(W_n(x)) - \nabla(I_n(x)))^2/(2\kappa)^2} \cdot \frac{1}{1 + (\nabla(W_n(x)) + \nabla(I_n(x)))^2/(2\omega\kappa)^2} \quad (2)$$

where $W_n(x)$ is the water image, $I_n(x)$ is the iodine image, $\kappa$ is a constant corresponding to image noise, $\nabla$ is a gradient operator and $\omega$ is a constant that controls a degree of correlated diffusion. Typically, $\omega$ is selected to be less than 1 such that a greater weight is put into a direction where $\nabla W_n(x)$ and $\nabla I_n(x)$ vary in an opposite direction. Accordingly, a greater diffusion occurs when $\nabla W_n(x)$ and $\nabla I_n(x)$ are negatively correlated. Further, $W_n(x)$ and $I_n(x)$ are properly scaled such that the negatively correlated noise in both images are at the same level. In other words, $W_n(x)$ and $I_n(x)$ are scaled so as to ensure the monochromatic image $W_n(x)+I_n(x)$ does not contain any correlated noise.

Although, equation 2 depicts an exemplary diffusion function, the present technique may be implemented using any other suitable function that encourages diffusion in one direction and suppresses diffusion in another direction. By way of example, the image reconstruction unit may employ an anisotropic diffusion function, a non-sharp masking function, a gradient-based function and/or a median function to perform correlated diffusion for generating the first and the second diffused images corresponding to water and iodine, respectively.

Subsequently, the image reconstruction unit generates a first noise mask by subtracting the first diffused image from the first MD image and generates a second noise mask by subtracting the second diffused image from the second MD image at step 312. Particularly, the image reconstruction unit generates a noise mask containing substantially all of the filtered noise and structural information related to a particular basis material by subtracting the diffused image from the corresponding MD image for the particular basis material.

By way of example, the image reconstruction unit generates the water noise mask by subtracting the diffused water image from the original MD water image. The water noise mask, thus generated, includes the noise filtered from the water image as well as structures and vessels associated with the water image. Similarly, the image reconstruction unit generates the iodine noise mask by subtracting the diffused iodine image from the original MD iodine image. The iodine noise mask, thus generated, includes the noise filtered from the iodine image as well as structures and vessels associated with the iodine image. The water and the iodine noise masks, thus, are generated based on a concurrent evaluation of a correlation between the water and iodine images during the correlated diffusion process of step 310.

Directly applying the water noise mask to the water image and iodine noise mask to the iodine image, however, often results in flawed diffusion at the object edges, which in turn, result in flawed image reconstruction. Accordingly, at step 314, the image reconstruction unit processes one or more edges corresponding to the first MD image with the first noise mask to generate a final first noise mask. Similarly, the image reconstruction unit processes one or more edges corresponding to the second MD image with the second noise mask to generate a final second noise mask.

In one embodiment, for example, the image reconstruction unit generates the final water noise mask by mixing the water noise mask with the edges in the water image to switch the non-negatively correlated content from the water noise mask to the edges and vice versa. Similarly, the iodine noise mask is mixed with the edges in the iodine image to generate the final iodine noise mask. The image reconstruction unit mixes the water and the iodine noise masks with edges in corresponding MD images using, for example, simple addition or other suitable non-linear techniques. Mixing the water and iodine noise masks with edges in the corresponding MD images enables the image reconstruction unit to distinguish between the structural components and the negatively correlated noise values more accurately.

The mixing process, thus, enables easy detection and removal of non-noise information such as the contaminating structural components from the final first noise mask (final water noise mask) and the final second noise mask (final iodine noise mask). In one embodiment, the image reconstruction unit detects the non-noise information by segmenting the first MD image to obtain the first structure image and segmenting the second MD image to obtain the second structure image. Further, the image reconstruction unit subtracts the first structure image from the first noise mask and the second structure image from the second noise mask to remove the contaminating structural components from the corresponding noise masks. The subtraction process enables generation of the final first and the final second noise masks that may then be used to generate the final MD images that are substantially free from correlated noise.

Accordingly, the image reconstruction unit processes the first MD image with the final second noise mask and the second MD image with the final first noise mask to generate a final first MD image and a final second MD image at step 316. By way of example, the image reconstruction unit applies the final iodine noise mask to the original water image and the final water noise mask to the original iodine image to generate the final water and iodine images that are substantially free from noise.

The correlated noise suppression methods and systems disclosed hereinabove, thus, greatly enhance the quality of basis pair MD images by efficient noise suppression. Particularly, the present correlated noise suppression method eliminates most or all of the contaminating structural components corresponding to non-noise sources in a noise mask based upon a correlation between structural and/or noise related features within two or more noise masks.

As the present method extracts the noise masks based on a concurrent evaluation of the two MD images acquired at different energy levels, non-negatively correlated points indicative of non-noise information in the two MD images may be easily detected. The detected non-noise information may then be suppressed, for example, by mixing the noise masks with edges in the corresponding MD images. Alternative embodiments may employ edge detection algorithms, high pass filters or any other suitable technique for detecting and suppressing the non-noise information from the noise masks. The noise masks being substantially free from structural artifacts enable an efficient suppression of noise in the final MD images. The final MD images, thus, provide more reliable information that may be useful in making a substantially more accurate diagnosis.

Although the exemplary embodiments of the present technique are described with reference medical imaging, use of the present correlated noise suppression technique using correlated diffusion in other non-invasive imaging contexts, such as security screening and industrial nondestructive evaluation of manufactured parts is also contemplated. Accordingly, the present technique may be implemented in a plurality of imaging systems such as a single source imaging system, a multi-source imaging system, multi-detector imaging system, a photon counting energy discriminating detector imaging system, an X-Ray system, positron emission tomography (PET) scanner, a single photon emission computed tomography (SPECT) scanner, or any other suitable imaging system.

While only certain features of the present invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method comprising:
  acquiring a first set of projection data corresponding to X-rays generated at a first energy level and a second set of projection data corresponding to X-rays generated at a second energy level;
  decomposing the first set and the second set of projection data into a first set of material projection data corresponding to a first basis material and a second set of material projection data corresponding to a second basis material;
  reconstructing a first materially decomposed (MD) image of the first basis material using the first set of material projection data and a second MD image of the second basis material using the second set of material projection data;
  estimating a direction of correlation between noise values corresponding to the first MD image and noise values corresponding to the second MD image;
  diffusing the first MD image and the second MD image to generate a first diffused image and a second diffused image based on the estimated direction of correlation;
  generating a first noise mask by subtracting the first diffused image from the first MD image and generating a second noise mask by subtracting the second diffused image from the second MD image;
  processing one or more edges corresponding to the first MD image with the first noise mask to generate a final first noise mask, and processing one or more edges corresponding to the second MD image with the second noise mask to generate a final second noise mask; and
  processing the first MD image with the final second noise mask to generate a final first MD image and processing the second MD image with the final first noise mask to generate a final second MD image.

2. The method of claim 1, wherein estimating a direction of correlation between noise values corresponding to the first MD image and noise values corresponding to the second MD image comprises:
  determining calibration information corresponding to an imaging system; and
  computing the direction of correlation based on the determined system calibration information, a basis material attenuation for the first basis material, a basis material attenuation for the second basis material, or combinations thereof.

3. The method of claim 1, wherein the system calibration information comprises an X-ray spectrum corresponding to the first energy level, an X-ray spectrum corresponding to the second energy level, an efficiency of one or more detectors in the imaging system, an X-ray filtration, or combinations thereof.

4. The method of claim 1, wherein estimating a direction of correlation between noise values corresponding to the first MD image and noise values corresponding to the second MD image comprises:
  determining an initial estimate of the direction of correlation based on calibration information corresponding to an imaging system;
  diffusing the first MD image and the second MD image using the initial estimate of the direction of correlation to generate a first initial diffused image and a second initial diffused image;
  generating a first initial noise mask by subtracting the first initial diffused image from the first MD image and generating a second initial noise mask by subtracting the second initial diffused image from the second MD image;
  applying a series of window functions to the first initial noise mask and the second initial noise mask to generate a first series of windowed noise masks and a second series of windowed noise masks;
  determining an optimal parameter value for each corresponding pair of windowed noise masks in the first series and the second series of windowed noise masks such that a result of mixing a first windowed noise mask and a corresponding second windowed noise mask in accordance with a value of the determined parameter results in a residual image that minimizes a norm; and
  computing an estimated direction of correlation at each of a plurality of image locations based on the determined parameter for each window function in the series of window functions and the value of each window function at each of the plurality of image locations.

5. The method of claim 1, wherein diffusing the first MD image and the second MD image comprises using a correlated diffusion function that encourages a diffusion of negatively correlated points in the first MD image and the second MD image along the estimated direction of correlation and suppresses a diffusion of non-negatively correlated points in the first MD image and the second MD image.

6. The method of claim 5, wherein the correlated diffusion function comprises an anisotropic diffusion function, a non-sharp masking function, a gradient-based function or a median function.

7. The method of claim 1, wherein generating the first noise mask and the second noise mask comprises removing information corresponding to non-noise sources from the first noise mask and the second noise mask.

8. The method of claim 7, wherein removing non-noise information comprises:
  segmenting the first MD image to obtain a first structure image and segmenting the second MD image to obtain a second structure image; and
  subtracting the first structure image from the first noise mask and subtracting the second structure image from the second noise mask.

9. An imaging system, comprising:
  a data acquisition system that acquires a first set of projection data corresponding to X-rays generated at a first energy level and a second set of projection data corresponding to X-rays generated at a second energy level; and
  an image reconstruction unit communicatively coupled to the data acquisition system, wherein the image reconstruction unit:
  decomposes the first set and the second set of projection data into a first set of material projection data corresponding to a first basis material and a second set of material projection data corresponding to a second basis material;
  reconstructs a first MD image of the first basis material using the first set of material projection data and a second MD image of the second basis material using the second set of material projection data;
  estimates a direction of correlation between noise values corresponding to the first MD image and noise values corresponding to the second MD image;
  diffuses the first MD image and the second MD image to generate a first diffused image and a second diffused image based on the estimated direction of correlation;
  generates a first noise mask by subtracting the first diffused image from the first MD image and generates a second noise mask by subtracting the second diffused image from the second MD image;
  processes one or more edges corresponding to the first MD image with the first noise mask to generate a final first noise mask, and processes one or more edges corresponding to the second MD image with the second noise mask to generate a final second noise mask; and
  processes the first MD image with the final second noise mask to generate a final first MD image and processes the second MD image with the final first noise mask to generate a final second MD image.

10. The imaging system of claim 9, wherein the imaging system comprises a computed tomography (CT) system, a single source imaging system, a multi-source imaging system, multi-detector imaging system, a photon counting energy discriminating detector imaging system, an X-Ray system, positron emission tomography (PET) scanner, a single photon emission computed tomography (SPECT) scanner, or combinations thereof.

11. The imaging system of claim 9, wherein the image reconstruction unit estimates the direction of correlation between the first MD image and the second MD image based on the determined system calibration information, a basis material attenuation for the first basis material, a basis material attenuation for the second basis material, or combinations thereof.

12. The imaging system of claim 11, wherein the system calibration information comprises an X-ray spectrum corresponding to the first energy level, an X-ray spectrum corresponding to the second energy level, efficiency of one or more detectors in the imaging system, an X-ray filtration, or combinations thereof.

13. The imaging system of claim 9, wherein the image reconstruction unit:
  determines an initial estimate of the direction of correlation based on calibration information corresponding to an imaging system;
  diffuses the first MD image and the second MD image using the initial estimate of the direction of correlation to generate a first initial diffused image and a second initial diffused image;
  generates a first initial noise mask by subtracting the first initial diffused image from the first MD image and generating a second initial noise mask by subtracting the second initial diffused image from the second MD image;

applies a series of window functions to the first initial noise mask and the second initial noise mask to generate a first series of windowed noise masks and a second series of windowed noise masks;

determines an optimal parameter value for each corresponding pair of windowed noise masks in the first series and the second series of windowed noise masks such that a result of mixing a first windowed noise mask and a corresponding second windowed noise mask in accordance with a value of the determined parameter results in a residual image that minimizes a norm; and computes an estimated direction of correlation at each of a plurality of image locations based on the determined parameter for each window function in the series of window functions and the value of each window function at each of the plurality of image locations.

14. The imaging system of claim 9, wherein the image reconstruction unit diffuses the first MD image and the second MD image using a correlated diffusion function that encourages a diffusion of negatively correlated points in the first MD image and the second MD image along the estimated direction of correlation and suppresses a diffusion of non-negatively correlated points in the first MD image and the second MD image.

15. The imaging system of claim 9, wherein the image reconstruction unit:

segments the first MD image to obtain a first structure image and segmenting the second MD image to obtain a second structure image; and subtracts the first structure image from the first noise mask and subtracting the second structure image from the second noise mask to remove information corresponding to non-noise sources from the first noise mask and the second noise mask.

16. A computed tomography (CT) system, comprising:

at least one radiation source that generates X-rays at a first energy level and at a second energy level;

a detector assembly coupled to the at least one radiation source that detects the X-rays generated from the radiation source;

an image reconstruction unit coupled to the detector assembly, wherein the image reconstruction unit:

acquires a first set of projection data corresponding to X-rays generated at the first energy level and a second set of projection data corresponding to X-rays generated at the second energy level;

decomposes the first set and the second set of projection data into a first set of material projection data corresponding to a first basis material and a second set of material projection data corresponding to a second basis material;

reconstructs a first MD image of the first basis material using the first set of material projection data and a second MD image of a second basis material using the second set of material projection data;

estimates a direction of correlation between noise values corresponding to the first MD image and noise values corresponding to the second MD image;

diffuses the first MD image and the second MD image to generate a first diffused image and a second diffused image based on the estimated direction of correlation;

generates a first noise mask by subtracting the first diffused image from the first MD image and generates a second noise mask by subtracting the second diffused image from the second MD image;

processes one or more edges corresponding to the first MD image with the first noise mask to generate a final first noise mask, and processes one or more edges corresponding to the second MD image with the second noise mask to generate a final second noise mask; and processes the first MD image with the final second noise mask to generate a final first MD image and processes the second MD image with the final first noise mask to generate a final second MD image.

* * * * *